United States Patent Office 2,761,618
Patented Sept. 4, 1956

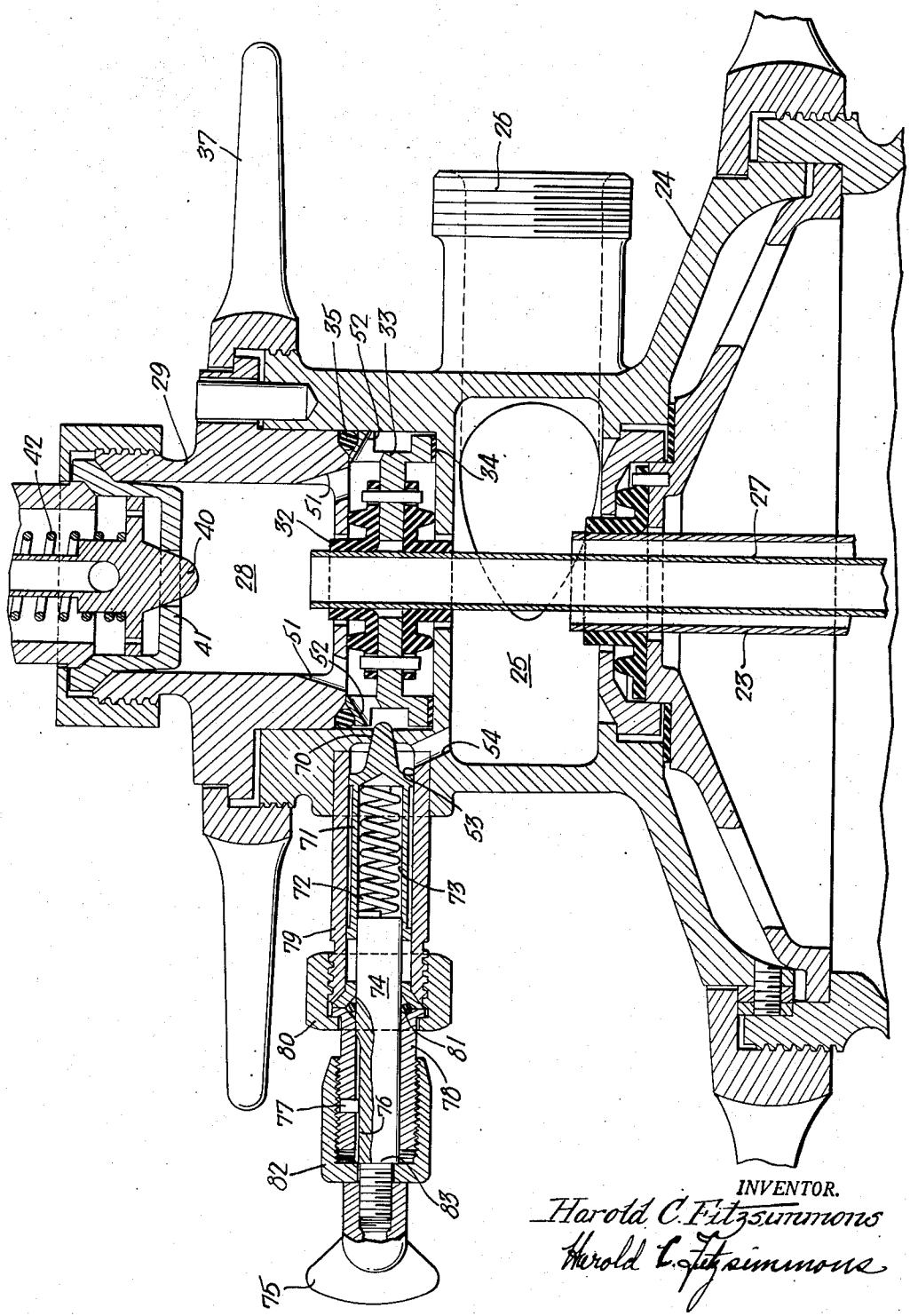

2,761,618

CENTRIFUGAL SEPARATION

Harold C. Fitzsimmons, West Chester, Pa., assignor to The Sharples Corporation, a corporation of Delaware Application September 26, 1952, Serial No. 311,634

7 Claims. (Cl. 233—19)

This invention relates to new and useful improvements in centrifugal machines of the type shown and described in my co-pending application Serial No. 222,483, filed April 23, 1951, for Centrifugal Separation, now patent No. 2,726,808, granted December 13, 1955. More particularly, the present invention relates to new and useful improvements in the standardization valve which controls communication between the cream outlet and skim milk outlet of the machine.

In centrifugal machines of the type set forth, whole milk to be separated is introduced under pressure into the rotor where the skim milk is separated from the cream by centrifugal force under what is known in the art as full bowl conditions. Under the action of the centrifugal force, the skim milk, being the heavier component, moves outwardly and then upwardly into a housing from which it is piped away to skim milk storage.

The cream, which is a suspension of butterfat globules in milk, moves inwardly toward the center of the machine, and then upwardly through a sleeve into a second housing. This cream is delivered from the machine through a relief valve which is operable to vary the back pressure on the cream discharging from the rotor into the housing. An increase in back pressure will result in a cream of higher concentration, and a decrease in back pressure will result in a cream of lower concentration so that it is possible to discharge cream of whatever concentration is desired.

As is well known, whole milk comprises a dispersion of butterfat in a continuous aqueous phase of milk solubles, that cream comprises a dispersion in considerably higher concentration of butterfat in said aqueous phase, and that skim milk comprises a dispersion in extremely low concentration of butterfat in said aqueous phase. It will be noted that, in each instance, the butterfat is in the dispersed phase.

A metering valve is provided in the machine which permits communication between the cream housing and the skim milk outlet housing. By means of this valve any desired butterfat content may be introduced into the skim milk to make a whole milk of the desired concentration, and the percentage of cream delivered into the skim milk can be varied at will by proper adjustment of the metering valve. Such changes in percentages can be made at any time throughout the course of a run and do not require that the machine be shut down, thereby permitting a continuous delivery of milk of the desired concentration.

It has been found, particularly when cream of a high concentration is being produced, that the cream sometimes tends to solidify in the ports and passages of the metering valve through which it passes in flowing from the cream housing to the skim milk outlet housing. If this condition is permitted to continue partial blockage of the flow area through the metering valve occurs with a resulting reduction in the flow of cream into the skim milk housing. This results in a variation of the percentage of butterfat in the standardized milk which, of course, is highly objectionable.

With the foregoing in mind, the principal object of the present invention is to provide a novel metering or standardizing valve construction and arrangement which, for a given setting of the valve, will maintain a constant percentage of butterfat in the standardized milk. Another object of the invention is to provide a metering valve construction and arrangement as set forth which is operable to maintain a predetermined percentage of butterfat in the standardized milk irrespective of any tendency for the cream to thicken and collect in the ports and passages through which it flows from the cream housing to the milk outlet housing. A further object of the invention is to provide a metering valve construction and arrangement which is operable automatically to permit passage through the metering valve of accumulated masses of thickened cream thereby freeing the ports and passages through which the cream flows from the cream housing to the skim milk outlet housing.

These and other objects of the invention and the various features and details of the construction and operation thereof, are hereinafter fully set forth and described with reference to the accompanying drawing in which the single figure is an enlarged fragmentary sectional view vertically through a portion of a centrifuge machine of the type described showing the construction and arrangement of the metering or standardizing valve embodying the present invention.

With reference to the drawing, a portion of a centrifugal machine is shown comprising a housing 24 defining in the upper end thereof a chamber 25 in which the separated skim milk is received through a sleeve 23 for discharge outwardly of the centrifuge machine through an outlet 26. Extending upwardly in the housing 24 coaxially thereof is a sleeve 27 through which the separated cream component of the milk is caused to pass into a chamber 28 defined by a housing 29. Two seals 32 are in close engagement with the sleeve 27, being mounted on each side of the spacer 33 which is clamped in position against gaskets 34 and 35 by the tightening of the housing 29 by means of the nut 37. The seals 32 prevent leakage between the housings 24 and 29.

As previously stated, whole milk to be separated is introduced under pressure into the rotor body. Under the action of centrifugal force, the skim milk, being the heavier component, moves outwardly and then upwardly through sleeve 23 into the chamber 25 in housing 24 from which it is piped away to skim milk storage through the outlet 26.

The cream, which is a suspension of butterfat globules in milk, moves inwardly toward the center of the machine and then upwardly through the sleeve 27 into the chamber 28 of housing 29. This cream is delivered from the machine through a relief valve comprising the valve disc 40 and the valve seat 41. The lifting of the valve disc 40 is restrained by the spring 42, and means (not shown) is provided for adjusting the restraining force of the spring 42 which will vary the back pressure on the cream discharging through the relief valve to the outlet from which it is piped away to storage. An increase in back pressure will result in a cream of higher concentration, and a decrease in back pressure will result in a cream of lower concentration so that a regulation of the pressure on spring 42 makes it possible to discharge cream of whatever concentration is desired.

As previously stated, a metering valve is provided in the centrifuge which may be operated to permit communication between the cream chamber 28 and the skim milk outlet chamber 25 to enable any desired butterfat content to be introduced into the skim milk to make a whole milk of the desired concentration. In this connection, a channel 51 in the lower part of the cream chamber 28 communicates with a port 52 through the seal spacer 33. Another port 70 in the upper-part of the skim milk housing 24 provides communication from port 52 to a valve chamber 53 and a port 54 communicates from the chamber 53 to the skim milk chamber 25. A valve element 71 has a tapered end that seats within the port or opening 70 which functions as a valve seat and controls the flow of cream from chamber 28 to chamber 25.

According to the present invention, a valve spring 72 is inserted in a recess 73 in the valve element 71. This spring 72 acts between the valve element and a valve stem 74 which telescopes within the valve element and has its opposite end threaded to engage a lock nut 75. A portion of the valve stem 74 is grooved at 76 to engage a pin 77 which is fastened to the valve head 78. The valve head 78 is held tightly against a threaded extension 79 of the skim milk housing 24 by means of a nut 80. A bevel is provided between the valve head 78 and the threaded extension 79 of the skim milk housing 24, in which is placed a flexible gasket 81 to seal against leakage at this joint. The outside of the valve head 78 is threaded to receive an adjusting nut 82 which bears against a shoulder 83 on the valve stem 74.

As previously described, whole milk is fed into the machine under pressure, and is separated into skim milk, which discharges into chamber 25, and cream which discharges into chamber 28. The pressure of the feed of liquid is transmitted through the rotor into the cream chamber 28, causing the lifting of the valve disc 40 against the resistance of the spring 42. On the skim-milk side, however, much of the feed pressure is dissipated through the need to force the milk outward into a zone of higher peripheral speed, and then inwardly into a zone of lower peripheral speed. There is therefore a greater available head or discharge pressure in the cream chamber 28 than in the skim milk chamber 25.

When the centrifuge is in normal operation, the skim milk discharge will be substantially free of butterfat though not entirely, and the cream discharge will contain, for example, 30% butterfat, or any other desired butterfat content depending on the adjustment of the spring 42 acting on the valve 40. If it is desired, for example, that the whole milk be available having, for example, 3% butterfat content, the adjusting nut 82 is screwed outwardly, permitting liquid pressure of cream to force the valve element 71 off its seat 70, and the metering valve is then locked in its adjusted position by means of the nut 75. Because of the higher pressure in the cream outlet housing, a portion of cream will flow through ports 51 and 52, through valve port 70 to the valve chamber 53 and thence into the skim milk housing through port 54.

As previously stated, it has been found in practice that due to coalescence the cream may tend to thicken and accumulate in the ports and passages of the metering valve through which it flows from the cream chamber 28 to the skim milk chamber 25. If this condition is permitted to continue, partial blockage of the metering valve occurs thereby causing reduction in the flow of cream to the skim milk chamber 25 and resulting in a variation in the butterfat content in the standardized milk which, of course, is highly objectionable.

However, in the metering valve construction of the present invention, the position of the valve element 71 in the port 70 is not fixed for a given adjustment of the metering valve but will vary according to changes in the relation between the tension on spring 72 and the back pressure in the cream chamber 28. Consequently, when a partial blockage occurs in the metering valve as the result of an accumulation of thickened cream in the ports 51 and 52, and especially the valve port 70, the back pressure in the cream chamber 28 will increase or rise due to the inability of the cream to flow through the metering or standardizing valve. This increase or rise in the back pressure acting on the valve element 71 causes the spring 72 to be compressed in relation to the amount of rise in back pressure thereby further opening the metering valve and increasing the flow area through the port 70 to an extent sufficient to pass therethrough the thickened masses of cream which have accumulated in the ports and passages. When these have been cleared, and normal flow has been reestablished, the pressure is reduced because of the increased flow and the spring returns the valve element to its original position.

It will be apparent, therefore, that the present invention provides a standardizing valve construction for centrifugal machines by means of which the desired butterfat content introduced into the skim milk is constant and reliable and is not subject to variations or otherwise affected by any tendency for the cream to thicken and accumulate in the metering valve through which it flows from chamber 28 to chamber 25.

While a particular embodiment of the present invention has been illustrated and described herein, it is not intended to limit the invention to such disclosure, and changes and modifications may be made therein and thereto within the scope of the following claims.

I claim:

1. In a centrifuge for the separation under full bowl conditions of a continuous stream of a dispersion into two continuous streams of respectively different standardized dispersed phase concentrations having means to maintain a predetermined back pressure on one of said streams, means for continuously metering a regulated amount of said one stream into the other stream comprising a valve including a valve element cooperable with a valve seat and yieldingly mounted for movement relative to said valve seat in response to increases in said back pressure caused by blocking of the flow of said one stream through the valve due to thickening and accumulation of material in said valve, the yielding of said valve element operating to increase the opening through said valve according to the increase in said back pressure and permitting the said accumulated material to pass through the valve thereby restoring normal flow of said one stream through said valve at said predetermined back pressure.

2. In a centrifuge for the separation under full bowl conditions of a continuous stream of a dispersion into two continuous streams of respectively different standardized dispersed phase concentrations having means to maintain a predetermined back pressure on the stream of greater dispersed phase concentration, means for continuously metering a regulated amount of the stream of greater dispersed phase concentration into the other stream comprising a valve including a valve element cooperable with a valve seat and yieldingly mounted for movement relative to said valve seat in response to increases in said back pressure caused by blocking of the flow of said stream of greater dispersed phase concentration through the valve due to thickening and accumulation of material in said valve, the yielding of said valve element operating to increase the opening through the valve according to the increase in said back pressure and permitting the said accumulated material to pass through said valve thereby restoring normal flow of said stream of greater dispersed phase concentration through said valve at said predetermined back pressure.

3. In a centrifuge for the separation under full bowl conditions of a continuous stream of a dispersion into two continuous streams of respectively different standardized dispersed phase concentrations having means to maintain a predetermined back pressure on the stream of greater dispersed phase concentration, means for continuously metering a regulated amount of the stream of greater dispersed phase concentration into the other stream comprising a valve including a valve element cooperable with a valve seat, and means yieldingly mounting said valve element for opening movement with respect to the valve seat in response to increases in said back pressure caused by blocking of the flow of said stream of greater dispersed phase concentration through the valve due to thickening and accumulation of material in said valve, the yielding of said valve element operating to increase the opening through the valve according to the increase in said back pressure and permitting the said accumulated material to pass through said valve thereby restoring normal flow of said stream of greater dispersed phase concentration through said valve at said predetermined back pressure.

4. Apparatus comprising a centrifuge having a rotor for the separation under full bowl conditions of a continuous stream of a dispersion into two continuous streams which differ in concentration of the dispersed phase, said rotor making available a differentially higher discharge pressure on one of said separated streams than on the other, means for maintaining a substantially constant back pressure on said one stream, and means for continuously metering a regulated amount of said one stream into the other stream comprising a valve including a valve element cooperable with a valve seat and yieldingly mounted for movement relative to said valve seat in response to increases in said back pressure caused by blocking of the flow of said one stream through the valve due to thickening and accumulation of material in said valve, the yielding of said valve element operating to increase the opening through the valve according to the increase in said back pressure and permitting the said accumulated material to pass through said valve thereby restoring normal flow of said one stream through said valve at said substantially constant back pressure.

5. Apparatus comprising a centrifuge having a rotor for the separation under full bowl conditions of a continuous stream of a dispersion into continuous streams of two dispersions differing in dispersed phase concentration, said rotor making available a differentially higher discharge pressure on the separated stream of lesser density, a relief valve for creating a substantially constant back pressure on the discharge of the stream of lesser density, a metering valve communicating with said last-mentioned stream between said centrifuge rotor and said relief valve for continuously metering a regulated amount of said last-mentioned stream into the other of said streams, said metering valve having a valve element cooperable with a valve seat, and means yieldingly mounting said valve element for opening movement with respect to the valve seat in response to increases in said back pressure caused by blocking of the flow of said stream of lesser density through the metering valve due to thickening and accumulation of material in said metering valve, the yielding of said valve element operating to increase the opening through the metering valve according to the increase in said back pressure and permitting the said accumulated material to pass through said metering valve thereby restoring normal flow of said stream of lesser density through said metering valve at said substantially constant back pressure.

6. Apparatus comprising a centrifuge having a rotor for the separation under full bowl conditions of a continuous stream of a dispersion into continuous streams of two dispersions of different dispersed phase content, said rotor making available a differentially higher discharge pressure on the separated stream of lesser density, a conduit operatively connected to and leading from said centrifuge rotor for conducting away the separated stream of lesser density, a relief valve in said conduit to restrict flow therethrough with substantially constant back pressure, a second conduit operatively connected to and leading from said centrifuge rotor for conducting away the other of said separated streams, a third conduit connecting said first-mentioned and second-mentioned conduits, said third conduit being connected to said first-mentioned conduit between said rotor and said relief valve, a valve in said third conduit for regulating flow therethrough and including a valve element cooperable with a valve seat, means yieldingly mounting said valve element for opening movement with respect to the valve seat in response to increases in said back pressure caused by blocking of the flow of said stream of lesser density through the last-mentioned valve due to thickening and accumulation of the material in said last-mentioned valve, the yielding of said valve element operating to increase the opening through the last-mentioned valve according to the increase in said back pressure and permitting the said accumulated material to pass through said last-mentioned valve thereby restoring normal flow of said stream of lesser density through said last-mentioned valve at said substantially constant back pressure.

7. In a centrifuge for the separation under full bowl conditions of a dispersion into two continuous streams of respectively different dispersed phase concentrations havinig means to maintain a predetermined back pressure on the stream of greater dispersed phase concentration, means to continuously meter a regulated amount of the stream of greater dispersed phase concentration into the other stream comprising means defining a passage providing communication between said streams, a valve seat in said passage having a port therein, a valve element cooperable with said valve seat to regulate flow through said port, a valve steam normally adjustable to predeterminedly fix the setting of the valve element relative to said valve seat, spring means interposed between said valve stem and valve element yieldingly mounting the latter for movement relative to said valve stem and away from the valve seat in response to increases in said back pressure caused by blocking of the flow of said stream of greater dispersed phase concentration through the valve due to thickening and accumulation of material in said valve, the yielding of said valve element operating to increase the opening through the valve according to the increase in said back pressure and permitting the said accumulated material to pass through said valve thereby restoring normal flow of said stream of greater dispersed phase concentration through said valve at said predetermined back pressure.

References Cited in the file of this patent

UNITED STATES PATENTS

| | | |
|---|---|---|
| 2,145,544 | Hapgood | Jan. 31, 1939 |
| 2,160,140 | Hapgood | May 30, 1939 |
| 2,264,665 | Hall | Dec. 7, 1941 |
| 2,344,888 | Lindgren | Mar. 21, 1944 |

FOREIGN PATENTS

| | | |
|---|---|---|
| 474,017 | Great Britain | Oct. 25, 1937 |
| 691,386 | Germany | May 24, 1940 |